COMMUNICATIONS SECURITY SYSTEM
Filed Jan. 17, 1967 4 Sheets-Sheet 1
FIG. 1.
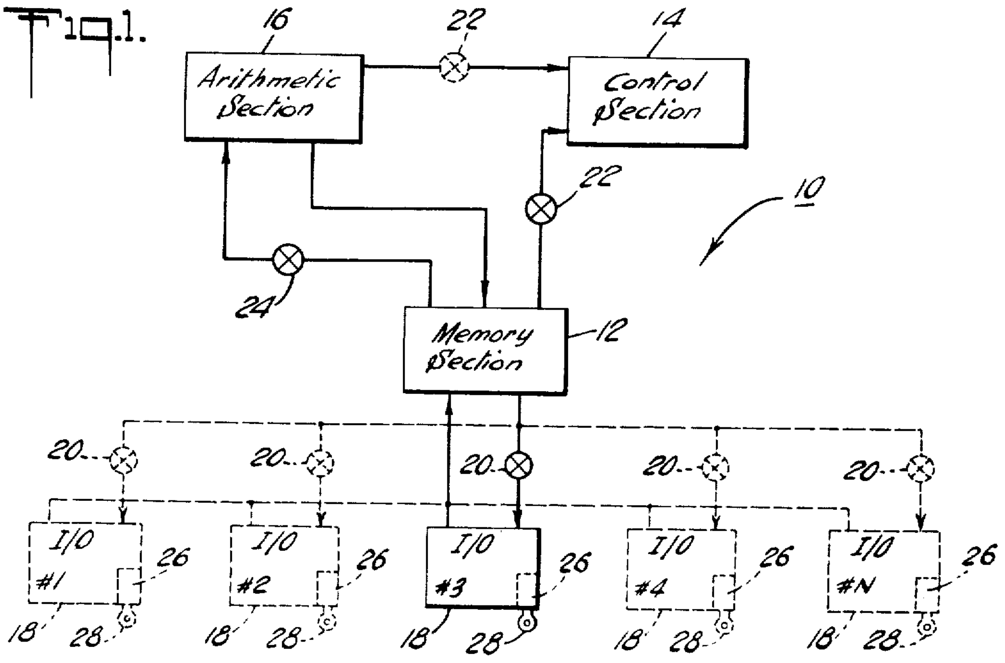
FIG. 2.
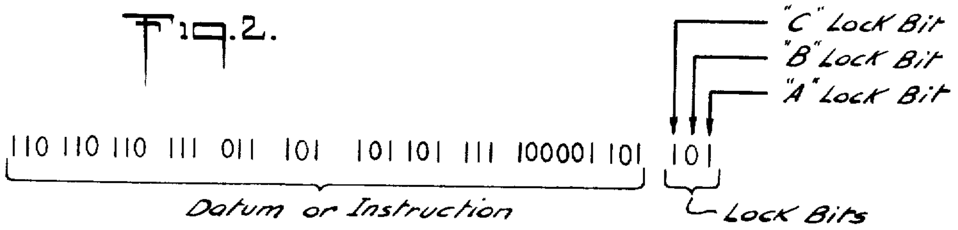
FIG. 3. FIG. 4.
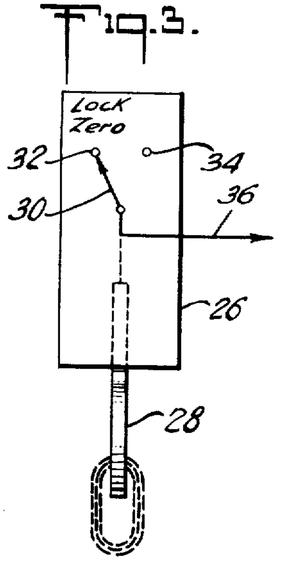
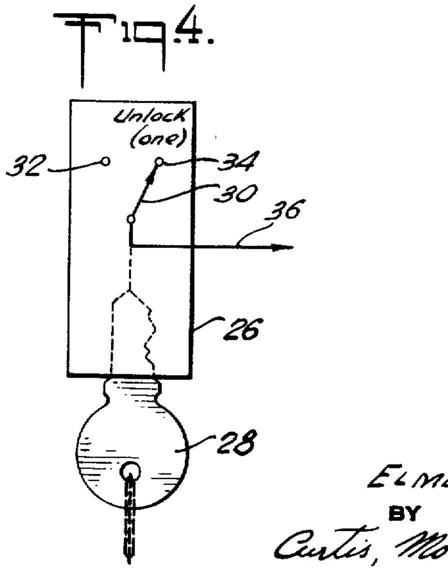
INVENTOR:
ELMER C. KUBIE
BY
Curtis, Morris & Safford
ATTORNEYS.

INVENTOR.
ELMER C. KUBIE
BY
Curtis, Morris & Safford
ATTORNEYS.

COMMUNICATIONS SECURITY SYSTEM

Filed Jan. 17, 1967 4 Sheets-Sheet 3

INVENTOR:
ELMER C. KUBIE
BY
Curtis, Morris & Safford
ATTORNEYS.

INVENTOR.
ELMER C. KUBIE
BY
Curtis, Morris & Safford
ATTORNEYS.

3,508,205
COMMUNICATIONS SECURITY SYSTEM
Elmer C. Kubie, Chappaqua, N.Y., assignor to Computer Usage Company, Inc., Mount Kisco, N.Y.
Filed Jan. 17, 1967, Ser. No. 609,842
Int. Cl. G05b *1/00*
U.S. Cl. 340—172.5 17 Claims

ABSTRACT OF THE DISCLOSURE

System for locking information transmitted, stored or operated upon in a computer or other information communication system. Mechanically-operated locks are used in conjunction with devices for prohibiting the transmission or other operation upon the information unless there is a match between a lock identification signal generated by unlocking the proper lock and a lock selector signal stored with the information.

This invention relates to systems for preventing the unauthorized dissemination of or operation upon information communicated in a communications system; in one specific embodiment of the invention, the system is employed to prevent unauthorized readout of or operation upon information stored in a digital computer.

The protection of computer programs and other confidential information against theft and unauthorized use is a severe problem. For example, many computer programs cost tens and even hundreds of thousands of dollars to create, and yet such valuable property can be stolen relatively easily by simply reading the program out of the computer in which it is stored. Similarly, confidential information such as process secrets and the like which are stored in computers easily can be stolen or altered by unauthorized operation of the computer in which they are stored.

Partial solutions for the above problems have been proposed in the past. For example, in certain time-sharing computer systems with multiple remote input/output stations, access to the computer cannot be gained at any station unless an identification code signal is input to the system by the user. If the signal is incorrect, access is denied. This arrangement has several difficulties. One is that the identification code number easily can be given out unintentionally by word of mouth to unauthorized persons who then can extract the confidential information from the system. Also, when the user reads out information, it also is displayed at the central data processing center, and thus is made available to unauthorized persons at the center.

Other systems such as that shown in U.S. Patent No. 3,108,257 to Buchholz have been proposed for preventing unauthorized alteration of data stored in a computer memory. Such systems use special "bits" in the stored digital words to identify them as being locked or unlocked, and a locked word cannot be stored until an appropriate signal is received from a supervisory program. However, unauthorized read out of the information still is permitted.

In view of the foregoing, it is an object of the present invention to provide a system for preventing the unauthorized dissemination of information transmitted, stored or operated upon in a computer or other communication system. It is a further object to provide such a system in which the information can be disseminated to unauthorized persons only if they first commit an overt physical act of unlawful breaking into equipment.

The drawings and description that follow describe the invention and indicate some of the ways in which it can be used. In addition, some of the advantages provided by the invention will be pointed out.

In the drawings:

FIGURE 1 is a schematic diagram of a computer system incorporating the present invention;

FIGURE 2 is a schematic representation of a binary digital "word" including "lock bits" provided in accordance with the present invention;

FIGURES 3 and 4 are schematic representations of a lock used in the present invention;

Figure 5:
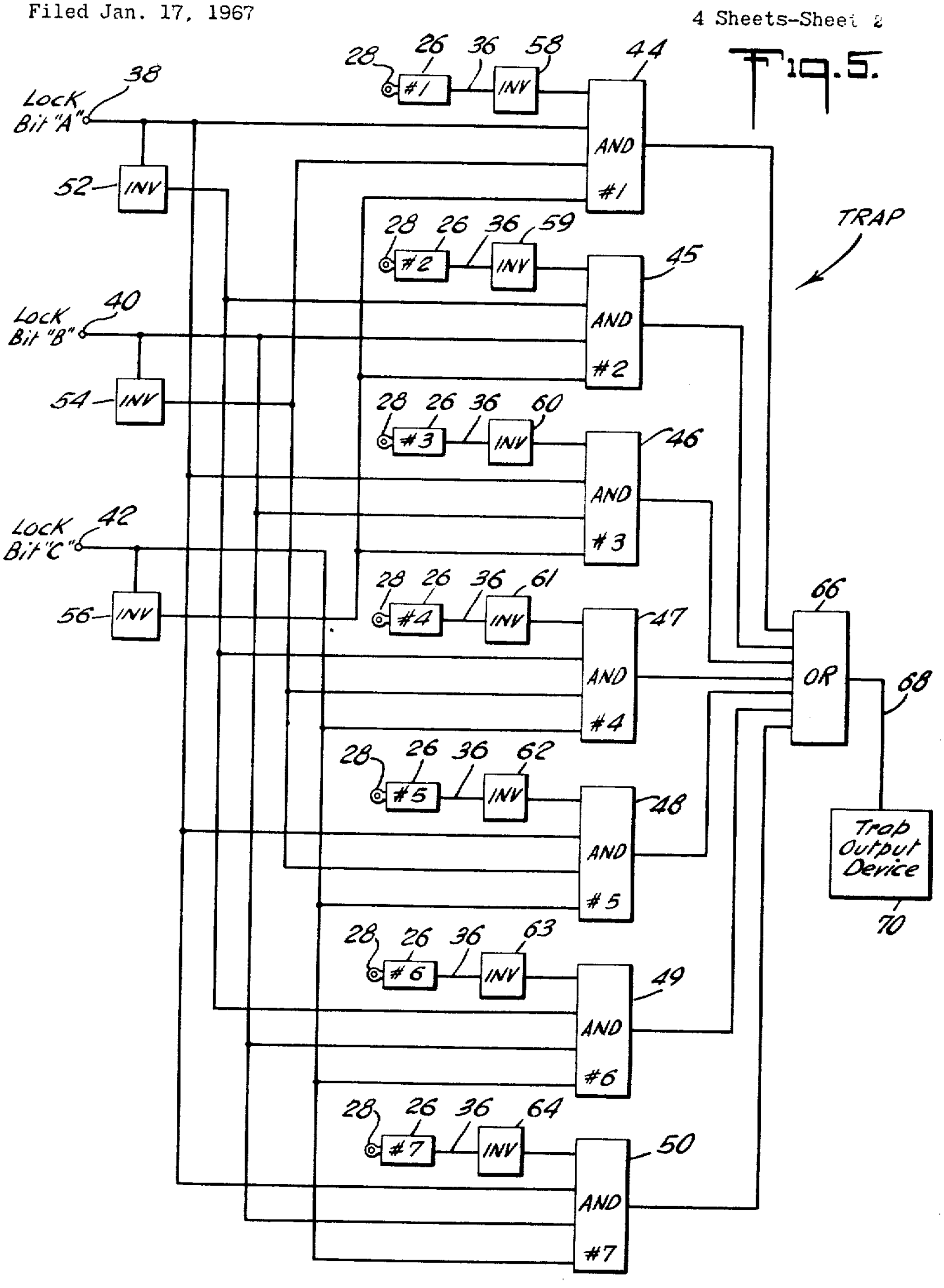
FIGURE 5 is a schematic diagram of a "trap" used in the system shown in FIGURE 1.

FIGURE 1 shows a typical digital computer system 10 including a memory section 12, a control section 14, an arithmetic section 16 and and input/output section 18. As is well known, the memory section 12 stores information, the arithmetic section performs arithmetic operation on the information, the control section 14 interprets instructions and causes the system to execute the instructions, and the input/output section 18 is the means for inserting information into or reading information out of the system.

In accordance with the present invention, a plurality of what will be termed herein as "traps" 20, 22 and 24 are interposed at selected points in the conduits connecting the various sections of the computer device 10. The input/output device 18 includes one or more mechanically-operated lock mechanisms 26 which is operated, for example, by a key 28. The lock mechanism 26 is electrically connected to each of the traps 20, 22 and 24 so that when the key 28 is turned, an identification signal is sent out by the mechanism 26 to the traps and is compared with a lock selector signal stored with the information in the memory. 12. If the identification signal and the lock selector signal match correctly, the information is made available for read out at the input/output device 18, and is made available to be operated upon in the arithmetic section 16. However, if the signals do not match correctly, some of the traps will prevent transmission of the information, others will sound audible alarms or warning lights or stop the operation of the computer entirely, or display lights will be turned off or turned on with a visual signal indicating an unauthorized attempt to read-out confidential information. It is preferred, however, that the trap 20 connecting the input/output device 18 to the memory 12 prevents transmission of prohibited words from the memory to the input/output device, thereby protecting the protected data against reproduction, processing or copying by unauthorized persons at the input/output device. The trap 22 interconnecting the memory section 12 and control section 14, preferably disables any display lights on the machine which might indicate the contents of the control section so that the information is protected against disclosure by this means. The trap 24 interconnecting memory section 12 and arithmetic section 16 preferably is of the same type as the trap 20 in that it prevents the transmission of the signal to the arithmetic section thereby foiling all attempts to edit, test, translate or modify a prohibited word. It should be understood, however, that the various types of traps may be positioned as desired and in accordance with the needs of the particular system involved.

In accordance with the present invention, as is shown in FIGURE 2, a lock selector signal, preferably in binary digital form, is stored with each "word" of information stored in the memory section 12. The lock selector signal appears at the right end of the word in FIGURE 2 and consists of three "lock bits", "A," "B" and "C". The number of lock bits need not be three; the number used depends upon the number of locks which are used in the system. The lock bits need not be stored at the end of the word, but may be stored at any other position in the word as desired.

Physically, the information shown in FIGURE 2 typically would be stored in one small selected spot on the surface of a magnetic drum or disk, or at one location in a magnetic core memory. Also, the information can be stored in serial or parallel form on magnetic tape, punched tape or other well known data storage media.

The lock mechanism 26 is conventional and preferably is of any type which can be operated by means of a key. Any other type of mechanically-actuated lock also can be used.

The operation of the lock 26 is shown in FIGURES 3 and 4. When the key 28 is in the position shown in FIGURE 3, it brings an arm 30 against a contact 32 which products a digital "zero" (no signal) over an output lead 36. When the key is turned to the position shown in FIGURE 4 to unlock the lock, the arm 30 engages a contact 34 which is energized by electrical D.C. source (not shown) so as to provide an electrical output signal comprising a digital "one" over lead 36. The output signal is sent over lead 36 to each of the traps in the system which is to be unlocked.

As was mentioned above, the number of lock bits provided in the lock selector signal is determined in accordance with the number of locks desired for the particular system involved. For example, if three lock bits are used as indicated in FIGURE 2, there are eight different ways in which the lock bits can be combined, and the combinations can be used to identify eight different locks, if desired. Similarly, if four lock bits were used, up to sixteen locks can be identified. However, in accordance with the present invention, one of the selector signals is a "universal" signal which is capable of selecting all of the locks; that is, if the lock bit pattern in a particular word is the "universal" pattern, the word can be read out and/or operated upon without restraint.

To give an example of the foregoing, assume that there are three lock bits "A," "B," and "C," as shown in FIGURE 2. With this arrangement, there will be one "universal" pattern and seven patterns each of which is used to select only one of seven different locks. The lock bit pattern and locks selected in this example are shown in the following table:

| Lock Bit Pattern: | Lock Selected |
|---|---|
| 000 ("universal") | All locks. |
| 001 | Lock #**1**. |
| 010 | Lock #**2**. |
| 011 | Lock #**3**. |
| 100 | Lock #**4**. |
| 101 | Lock #**5**. |
| 110 | Lock #**6**. |
| 111 | Lock #**7**. |

As an example of the use to which the seven locks could be put, they all could be located at the input/output device 18 so as to adapt the machine for use by seven different users, each with his own lock and key. The information stored or processed in the machine could be kept secure from disclosure to any but the authorized user. Suppose, as a further example, that the key for lock #2 is turned and a particular word is selected for read-out. If the lock bit pattern forming a part of that word is either the universal pattern or the pattern reserved for selection of lock #2, the word can be read out without interference from any of the traps. However, if the lock bit pattern is one reserved for one of the other locks, read-out, transmission and display of the information is prevented by the traps.

The traps may have many different forms. However, one particularly advantageous form is illustrated in FIGURE 5. Assuming first that the lock bits are stored in parallel rather than serial form, the "A" bit is transmitted to input lead 38 of the trap, and the "B" and "C" bits are transmitted, respectively, to input leads 40 and 42. Each of the input leads 38, 40 and 42 is connected to supply an input signal to four of seven "AND" circuits 44 through 50, and also is connected to a digital inverter device 52, 54 or 56. As is well known, the inverter device produces an output signal when it receives no input signal, and produces no output signal when it does receive an input signal, thus inverting the binary logic of the input signal it receives.

The output of each inverter circuit is connected to one input lead of each of three of the "AND" circuits 44 through 50. The interconnection of the components is in a binary logic arrangement such that there are four input leads to each of the "AND" circuits, three of which are connected to receive the lock bits, and the fourth receives a signal from one of the locks. The signal from the output lead 36 of each lock flows through one of seven inverter circuits 58–64 prior to reaching one of the "AND" circuits.

There is one "AND" circuit for each of the locks. Each of the "AND" circuits has four input leads and one output lead. It is of conventional design and produces an output signal only when it receives four input signals simultaneously. The output of each of the "AND" circuits is connected to an "OR" circuit 66 which conducts any output signal it receives from the "AND" circuit through an output lead 68 to an output device 70. In one type of trap, the output device 70 may be, for example, a normally closed switch in the line which interconnects two sections of the computer. When the switch is opened, communication of information between sections of the computer is prohibited. In another type of trap such as the trap 22, the output device 70 may be an alarm device which produces an unauthorized use warning signal, or may again be a normally closed switch which opens to turn off the display lights of the computer.

The operation of the trap device shown in FIGURE 5 is as follows. If a particular lock is unlocked by a user, and he gives instructions to the computer to read-out or operate upon a word stored in the memory 12 and the lock bit pattern assigned to that lock, the word will be read-out or operated upon in a normal manner. However, if the lock bit pattern does not properly match the lock identification signal, an output signal is provided to the output device 70, with the result that operation of the computer is interrupted or a warning device is actuated. For example, suppose the lock bit pattern for a particular word is 010, and this pattern is assigned to lock #2. When this pattern is applied to the input terminals 38, 40 and 42, output signals are developed by inverters 52 and 56 because no signals are applied to leads 38 and 42. However, an input signal is supplied over input line 40, so that inverter 54 does not give an output signal. The circuit interconnections are such that these signals are supplied to the lower three input leads of the "AND" circuit 45. If lock #2 is "unlocked," a signal is sent out over its output lead 36 to inverter 59, with the result that digital "zero" is supplied to "AND" circuit 45 and does not produce an output signal. Thus, the output device 7 is not energized and the word is allowed to be transmitted and operated upon in the computer in the normal manner. It also can be seen from the diagram that at least one "Zero" will be supplied to at least one of the input leads of each of the other "AND" circuits so that they also will not send signals to the output device 70. However, if lock #2 is in the locked condition when the lock bits are applied to the input of the trap, inverter 59 produces an output signal to "AND" circuit 45. Since "AND" circuit 45 also has signals on each of its other input leads, it now produces an output signal which actuates the trap output device 70 and prevents transmission of the word or actuates a warning device.

If the lock bit pattern of the word is 000 (the "universal" pattern), a zero will be supplied to at least one input lead of each of the "AND" circuits 44 through 50 so that the trap output device 70 will not be actuated regardless of which lock is or is not unlocked. Thus, words having the "universal" lock selector signal are available to all.

Simplification of the circuit shown in FIGURE 5 is possible merely by reversing the output of the lock-device 26 as illustrated in FIGURES 3 and 4. For example, if the device is modified to produce an output signal when it is locked and no output when it is unlocked, each of the inverters 58 through 64 can be eliminated.

The trap described above is intended for use primarily in a computer system having only one input/output device 18. In such an arrangement, the input/output device could have seven separate locks operated by means of seven different keys, each in the possession of one subscriber or user of the computer. However, in a further embodiment of the invention, there are plural input/output devices such as those shown in dashed outline in FIGURE 1, and each of the seven locks is located in one of the input/output devices. Thus, if three lock bits are used in the lock selector signals, with one "universal" pattern, there can be seven of such input/output devices at remote or nearby locations. Since the input/output devices normally will be operated by different persons, there should be some provision in the system preventing one user from reading another's locked information at the same time that the other is reading it. For example, if lock #2 in FIGURE 5 is unlocked at the same time that lock #1 is unlocked, both subscribers can read each other's data simultaneously. One solution for this problem is to convert the system into a "time-sharing" system by providing a supervisory program device which allows each of the input/output devices access to the computer system one-at-a-time for short periods of time. For example, if users at input/output devices #1 and #2 wish to use the computer at the same time, #1 would be allowed access for a few fractions of a second, then #2 for a similar time, then #1 again, and so forth. The amount of time and the sequence are controlled by the supervisory program.

Figure 6:
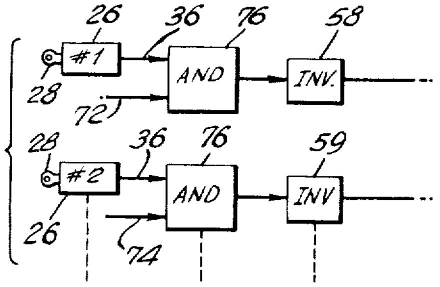
FIGURE 6 is a schematic diagram of a modification of the circuit shown in FIGURE 5.

An adaptation of the traps for use in such a system is illustrated in FIGURE 6. Each trap is the same as shown in FIGURE 5 except that an "AND" circuit 76 is inserted between each lock output lead 36 and each of the converters 58 through 64. Only two such "AND" circuits 76 are shown in FIGURE 6 in order to avoid unnecessary repetition. A second input lead to each of the "AND" circuits 76 is provided by leads such as 72 and 74 which receive the supervisory program signals. Thus, each of the trap devices 20 shown in FIGURE 1 operates to prevent transmission of data to its associated input/output device unless and until the appropriate lock is unlocked and simultaneously a second signal is received by the associated "AND" circuit 76 from the supervisory program. The "AND" circuit 76 then sends a signal to the inverter 58 which disables or actuates the corresponding four-input "AND" circuit and either enables the input/output device to operate in a normal manner, or disables it, depending on whether there is a proper match between the lock selector and identification signals.

Figure 7:
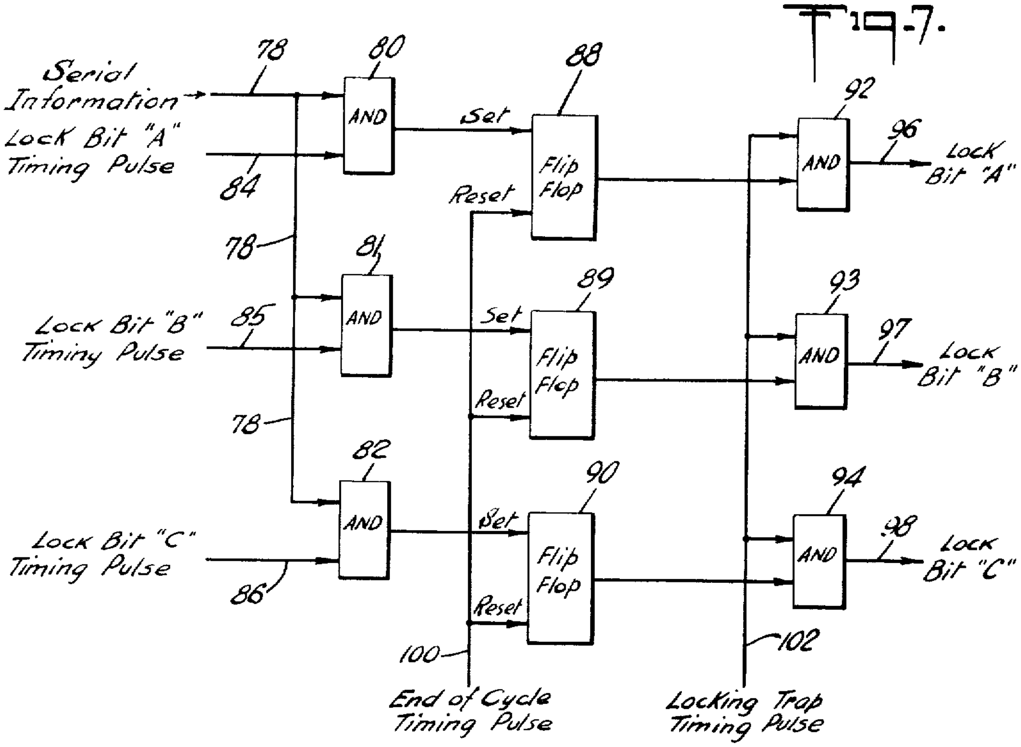
FIGURE 7 is a schematic diagram of another modification of the circuit shown in FIGURE 5.

In the foregoing, it was assumed that the word is in parallel form. If, however, the word is in serial form, it can be converted to parallel form by means of the circuit shown in FIGURE 7 prior to reaching the trap.

The serial information is input to one terminal of each of three "AND" circuits 80, 81 and 82 over an input lead 78. The output of each "AND" circuit is transmitted to a flip-flop circuit 88, 89 or 90, respectively, whose output is connected as one input to another "AND" circuit 92, 93 or 94. Timing pulses are provided sequentially over input leads 84, 85 and 86 to the "AND" circuits 80 through 82. The timing of the pulses is the same as the timing of the lock bits arriving on input lead 78. Each of the flip-flops 88, 89 and 90 is set sequentially to either a "one" or a "zero" output, depending upon the input to its "AND" circuit 80, 81 or 82. Then, at the time when it is desired to deliver the output to the trap, a locking trap timing pulse is supplied over lead 102 to each of the "AND circuits 92, 93, 94, thus reading out the information stored in the flip-flops 88, 89 and 90 and delivering it in parallel form to the trap. An end-of-cycle timing pulse then is supplied over input lead 100 to each of the flip-flops 88, 89 and 90 to reset them and restore the circuit to its initial condition for receiving a new information signal.

Figure 8:
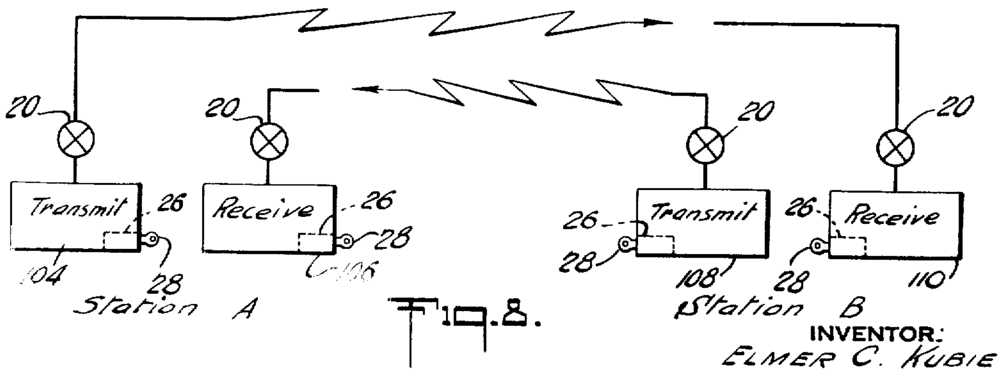
FIGURES 8, 9 and 10 are schematic diagrams of further embodiments of the present invention.

The communication system in which the present invention is used need not include computing facilities. A "pure" communications system is shown in FIGURE 8. Radio communication is illustrated schematically between two stations. The first station includes a transmitter 104 and a receiver 106. The second station includes a similar transmitter 108 and receiver 110. A trap device 20 is connected to each transmitter and receiver. The information being transmitted preferably is transmitted in digital form and has a series of lock-bits transmitted with it. Neither the transmitter or receiver of any station can be operated unless the lock 26 is properly operated and the information has the proper lock-selecting signal corresponding to that lock. The receiver must have the same lock in order to receive the signal. It should be evident, of course, that it is not necessary that the communication be by means of radio waves, but can be over telephone lines or other communication links without departing from the present invention.

Figures 9, 10:
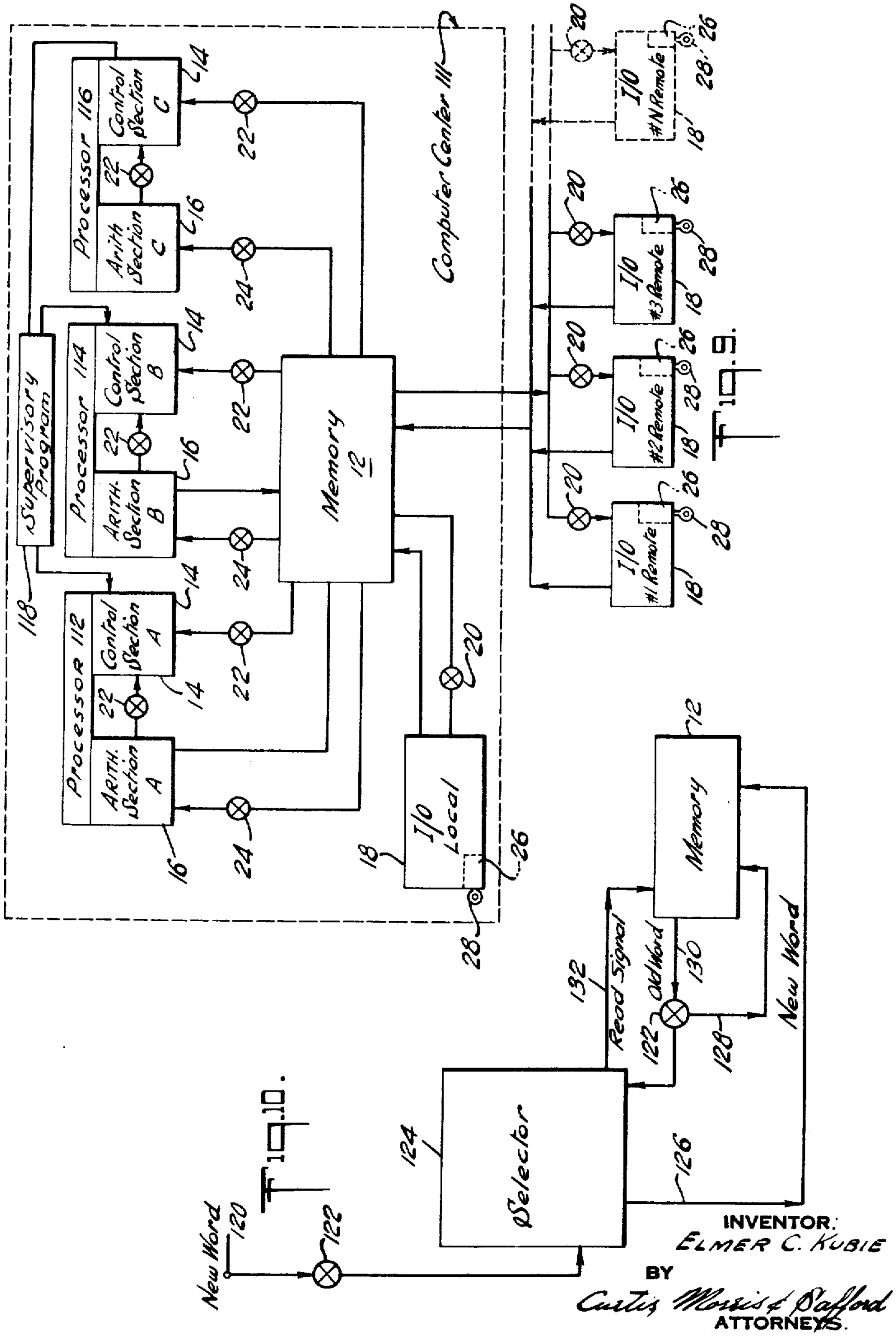

FIGURE 9 shows the invention in use in what is known as a "multi-processor" system which comprises a computer center 111 with multiple remote input/output devices 18. In the computer center 111 is a central memory 12 with multiple data processors 112, 114 and 116 and a local input/output device 18 connected to the memory 12. Each of the data processors includes an arithmetic section 16 and a control section 14 and is connected to a supervisory program device 118. Each of the input/output devices 18 has a lock 26 and a key 28. Traps 20, 22 and 24 are positioned in the transmission lines between components of the system as shown in FIGURE 9. Each trap has the same function as the traps bearing the same reference numerals in FIGURE 1; that is, the traps 20 and 24 prevent the transmission of signals over the respective lines, and the trap 22 disables display lights and/or energizes a warning device when then trap is operated. The supervisory program device 118 provides programmed instructions which sequentially unlock each input/output device for use with each different data processor. Each trap is modified as indicated in FIGURE 6 in order to enable it to operate with the supervisory program.

FIGURE 10 shows the invention in use in preventing unauthorized alteration of data stored in a memory device 12. A new digital word to be stored in the memory 12 is input at terminal 120 through an optional trap 122 to a selector device 124 constructed of conventional logic circuitry. The trap 122 is of the same basic construction as trap 20 and 24 described above in connection with FIGURE 5; that is, the trap 122 prevents transmission of the new word into the selector 124 unless the lock selector and lock identification signals match properly. This prevents the reading into memory of any information which is not authorized for handling at the input/output device in question.

When selector 124 receives the new word, it sends a "read" signal to memory 12 over an output lead 132. The "read" signal causes the old word stored in a selected register in the memory 12 to be read out to another trap 122. The old word has one or more lock bits stored with it as described above in connection with FIGURE 2. If the lock selector signal stored with the old word does not properly match the lock identification signal, the old word will not be transmitted to the selector 124. If this happens, the old word will be returned by means of a lead 128 to the memory 12. If the old word is transmitted to selector 124, the selector conducts the new word over a line 126 to be stored in the memory 12 in place of the old word.

As an alternative in any of the above-described devices, the lock selector signals may be used to lock only selected blocks of words instead of each individual word, thus reducing the cost of the system. The selector signal for each block would be read out before any word in the block so as to prohibit dissemination of the word if there is not a proper match between the lock selector and lock identification signals.

The above description of the invention is intended to be illustrative and not limiting. Various changes or modifications in the embodiments described may occur to those skilled in the art and these can be made without departing from the spirit or scope of the invention as set forth in the claims.

What is claimed is:

1. In an information transmission system, storage means for storing information with a lock signal indicating the locked or unlocked status of the information, receiving means for receiving and disclosing said data, trap means, a mechanically-operated lock mechanism for developing a lock identification signal and transmitting said lock identification signal to said trap means in response to mechanical actuation of said lock mechanism, said trap means including means for comparing said lock identification signal with said lock signal and preventing said receiving means from disclosing said information when said lock signal and said lock identification signal have a first predetermined relationship with respect to one another and permitting disclosure of said information when said signals have a second predetermined relationship with respect to one another

2. Apparatus as in claim 1 in which said lock signal is in digital form and is one of a plurality of preselected signals each identifying one of a plurality of said lock mechanisms, said trap means including "and" circuit means for combining said lock signal with the identification signal from each of said lock mechanisms and producing a communication-preventive signal when said "and" circuit means develops an output signal.

3. In a digital communication system including information storage means, a plurality of mechanically-actuated locks, a lock selector signal stored together with each quantum of information stored in said storage means, lock identification means connected to each of said locks for developing a lock identification signal in response to the mechanical actuation of said lock, means for comparing said lock selector signal of each quantum of information with each of said lock identification signals and producing a comparison signal indicating the existence of a pre-determined relationship between said selector and identification signals.

4. Apparatus as in claim 3 including trap means connected to said comparing means for preventing transmission of said information out of said storage means in response to receipt of a comparison signal from said comparing means.

5. Apparatus as in claim 3 including read out means for displaying said information in readable form, and means for disabling said read out means in response to receipt of a comparison signal from said comparing means.

6. Apparatus as in claim 3 including alarm means for developing an alarm signal in response to receipt of a comparison signal from said comparing means.

7. Apparatus as in claim 4 including an arithmetic section connected to said storage means and in which said trap means is located in the transmission path between said arithmetic section and said storage means.

8. Apparatus as in claim 5 in which said read out means is part of an input/output device connected to said storage means, and including a plurality of said input/output devices with one of said disabling means in the transmission path between each of said input/output devices and said storage means.

9. Apparatus as in claim 3 including an "and" circuit for each of said locks, means for conducting each bit of said lock selector signal to each of said "and" circuits together with the lock identification signal from one of said locks in a pattern such that an output signal is developed by the "and" circuit only when the lock selector and identification signals do not match.

10. In a digital communication system including information storage means, a plurality of mechanically-actuated locks, a lock selector signal stored together with each quantum of information stored in said storage means, lock identification means connected to each of said locks for developing a lock identification signal in response to the mechanical actuation of said lock, said lock identification means comprising means for developing a first binary digital signal when the lock is locked and a second binary digital signal of opposite type when the lock is unlocked, said lock selector signal being in digital form and having at least one digital bit, and means for combining said lock identification and lock selector signals so as to prevent transmission of said quantum of information out of said storage means when one of said first digital signals is produced by said lock identification means and is matched by said lock selector signal.

11. Apparatus as in claim 10 in which said combining means includes a plurality of "and" circuits each producing an output only when it receives a digital "one" at each of its inputs, and having at least two inputs, one input connected to receive said lock selector signal from one of said locks and the other input connected to receive said lock identification signal, security breach signalling means connected to said output of each of said "and" circuits, said second binary digital signal produced by said lock identification means being a digital "zero."

12. Apparatus as in claim 11 in which said lock selector signal has a plurality of binary digits, means including binary inverter means for conducting said lock selector signal to said "and" circuits in a pattern such that a preselected one of said "and" circuits will produce an output signal when the lock connected to its input is locked and a corresponding pre-selected combination of said digits is produced.

13. Apparatus as in claim 12 in which said conducting means pattern is such that with one pre-selected combination of said digits, none of said "and" circuits will produce an output signal regardless of whether any of said locks is locked or unlocked.

14. Apparatus as in claim 12 in which said digits are in serial form and including a serial-to-parallel converter connected to receive said digits and deliver its parallel-form output to said combining means.

15. Apparatus as in claim 10 including an input/output device, each of said locks being located at said device, said combining means being connected to said device to disable it when one of said locks produces one of said first digital signals and the latter signal is matched by said lock selector signal.

16. Apparatus as in claim 10 including a plurality of input/output devices, with one of said locks being located at each of said devices, supervisory program means for sequentially enabling each of said input/out devices and said combining means one-at-a-time.

17. Apparatus as in claim 10 including a second one of said combining means for preventing the transmission and storage of new information into said storage means when one of said first digital signals is produced by said lock identification means and is matched by a selector signal forming a part of said new information.

References Cited

UNITED STATES PATENTS

| | | | |
|---|---|---|---|
| 2,883,106 | 4/1959 | Cornwell et al. | 235—61.6 |
| 3,108,257 | 10/1963 | Buchholz | 340—172.5 |
| 3,245,045 | 4/1966 | Randlev | 340—172.5 |
| 3,264,615 | 8/1966 | Case et al. | 340—172.5 |
| 3,271,744 | 9/1966 | Petersen et al. | 340—172.5 |
| 3,328,768 | 6/1967 | Amdahl et al. | 340—172.5 |

OTHER REFERENCES

"Time-Sharing on Computers," Scientific American, September 1966, pp. 129–131 and 140.

GARETH D. SHAW, Primary Examiner

R. F. CHAPURAN, Assistant Examiner